(12) United States Patent
Huang et al.

(10) Patent No.: US 11,188,130 B2
(45) Date of Patent: Nov. 30, 2021

(54) METHOD AND APPARATUS FOR THERMAL MANAGEMENT USING DIFFERENT CUSTOMIZATION MODES

(71) Applicant: DELL PRODUCTS, LP, Round Rock, TX (US)

(72) Inventors: Johnny Tc Huang, New Taipei (TW); Tse-An Gino Chu, Zhongshan District (TW)

(73) Assignee: Dell Products L.P., Round Rock, TX (US)

( * ) Notice: Subject to any disclaimer, the term of this patent is extended or adjusted under 35 U.S.C. 154(b) by 66 days.

(21) Appl. No.: 16/688,439

(22) Filed: Nov. 19, 2019

(65) Prior Publication Data

US 2021/0149464 A1 May 20, 2021

(51) Int. Cl.
G06F 1/3203 (2019.01)
G06F 1/20 (2006.01)
G05B 15/02 (2006.01)

(52) U.S. Cl.
CPC .............. *G06F 1/206* (2013.01); *G05B 15/02* (2013.01); *G06F 1/3203* (2013.01); *G06F 2200/201* (2013.01)

(58) Field of Classification Search
CPC ................................................... G06F 1/3203
USPC .......................................................... 700/282
See application file for complete search history.

(56) References Cited

U.S. PATENT DOCUMENTS

| | | | |
|---|---|---|---|
| 9,952,636 B2 | 4/2018 | Montero et al. | |
| 10,234,926 B2 | 3/2019 | Gatson et al. | |
| 10,345,774 B2 | 7/2019 | Lovicott et al. | |
| 10,426,063 B2 | 9/2019 | North et al. | |
| 10,432,007 B2 | 10/2019 | Chang et al. | |
| 2007/0180490 A1* | 8/2007 | Renzi | H04L 63/145 726/1 |
| 2008/0307238 A1* | 12/2008 | Bieswanger | G06F 1/206 713/300 |
| 2009/0313623 A1* | 12/2009 | Coskun | G06F 9/5088 718/100 |
| 2013/0097609 A1* | 4/2013 | Li | G06F 1/324 718/104 |
| 2015/0198957 A1* | 7/2015 | Montero | G06F 3/04847 700/300 |
| 2016/0091938 A1* | 3/2016 | Edwards | G06F 1/3234 700/300 |
| 2017/0168851 A1* | 6/2017 | Lin | G06F 9/4411 |
| 2017/0322613 A1* | 11/2017 | Lin | G06F 1/3234 |

* cited by examiner

*Primary Examiner* — Suresh Suryawanshi
(74) *Attorney, Agent, or Firm* — Larson Newman, LLP

(57) ABSTRACT

An information handling system having improved thermal management includes a policy that is used by a basic input output system during a system startup. A mode controller customizes the policy by adjusting fan speed and/or workload. The customization utilizes a manual mode, an intelligent mode, or a historical data mode.

18 Claims, 6 Drawing Sheets

| Cooling Fans Sound Level (S) 310 | Cooling Fans Speed (rpm) 320 | Performance Level (%) 330 | Skin Temp. (°C) 340 |
|---|---|---|---|
| 0.2 | 1000 | 60 | 110 |
| 0.4 | 1900 | 70 | 100 |
| 0.7 | 2200 | 75 | 95 |
| 1.5 | 2900 | 80 | 84 |
| 2 | 3200 | 85 | 80 |
| 2.5 | 3600 | 88 | 76 |
| 3 | 4000 | 90 | 55 |
| 3.5 | 4500 | 96 | 44 |

*FIG. 3*

METHOD AND APPARATUS FOR THERMAL MANAGEMENT USING DIFFERENT CUSTOMIZATION MODES

FIELD OF THE DISCLOSURE

This disclosure generally relates to information handling systems, and more particularly relates to thermal management using different customization modes.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system having improved thermal management includes a basic input output system that is configured to use a policy during a system startup. A mode controller is configured to control a fan speed and a workload to customize the policy. The customization utilizes a manual mode, an intelligent mode, or a historical data mode.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIG. 3 is a reference data table that can be used by a mode controller to customize a policy according to an embodiment of the present disclosure;

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings.

Figure 1:
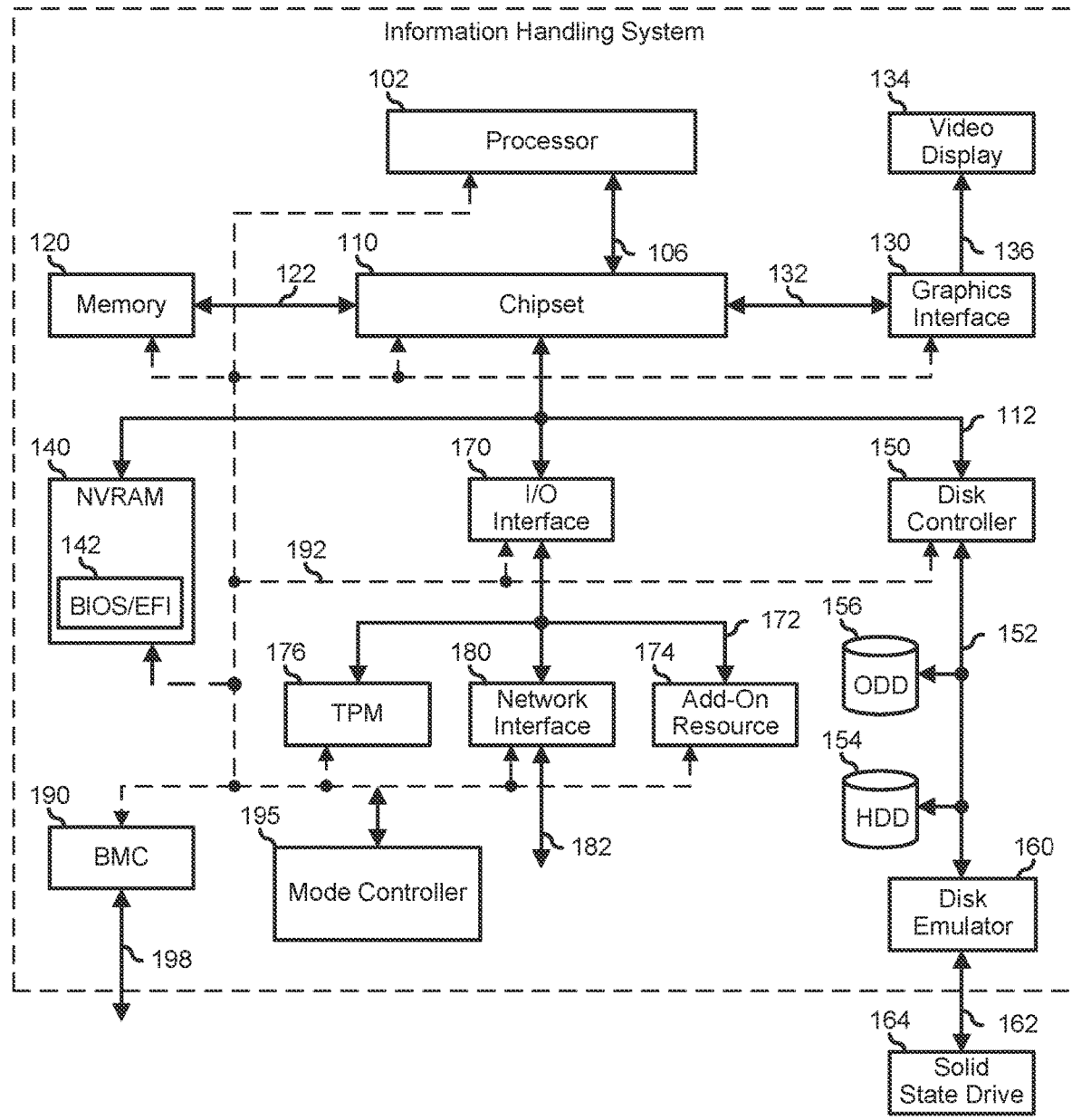
FIG. 1 is a block diagram illustrating an information handling system according to an embodiment of the present disclosure.

FIG. 1 illustrates an embodiment of an information handling system 100 including a processor 102, processor interface 106, chipset 110, memory 120, graphics adapter 130 connected to video display 134, non-volatile RAM (NV-RAM) 140 that includes a basic input output system/extensible firmware interface (BIOS/EFI) module 142, disk controller 150, hard disk drive (HDD) 154, optical disk drive (ODD) 156, disk emulator 160 connected to solid state drive (SSD) 164, an input/output (I/O) interface 170 connected to an add-on resource 174, a trusted platform module (TPM) 176, a network interface 180, a baseboard management controller (BMC) 190, and a mode controller 195. The information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. The elements depicted in information handling system 100 may not be representative of all elements of information handling systems in general. Moreover some elements as depicted in information handling system 100 may not be applicable to all information handling systems as described in the present embodiments.

Chipset 110 represents an integrated circuit or group of integrated circuits that manages data flow between the processor 102 and the other elements of information handling system 100. In a particular embodiment, chipset 110 represents a pair of integrated circuits, such as a north bridge component and a south bridge component. In another embodiment, some or all of the functions and features of chipset 110 are integrated with one or more of processors 102. Memory 120 is connected to chipset 110 via a memory interface 122. An example of memory interface 122 includes a Double Data Rate (DDR) memory channel, and memory 120 represents one or more DDR Dual In-Line Memory Modules (DIMMs). In a particular embodiment, memory interface 122 represents two or more DDR channels. In another embodiment, one or more of processors 102 include memory interface 122 that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like.

Graphics adapter 130 is connected to chipset 110 via a graphics interface 132, and provides a video display output 136 to a video display 134. An example of a graphics interface 132 includes a peripheral component interconnect-express interface (PCIe) and graphics adapter 130 can include a four lane (×4) PCIe adapter, an eight lane (×8) PCIe adapter, a 16-lane (×16) PCIe adapter, or another configuration, as needed or desired. In a particular embodiment, graphics adapter 130 is provided on a system printed circuit board (PCB). Video display output 136 can include a digital video interface (DVI), a high definition multimedia interface (HDMI), DisplayPort interface, or the like. Video display 134 can include a monitor, a smart television, an embedded display such as a laptop computer display, or the like.

NV-RAM 140, disk controller 150, and I/O interface 170 are connected to chipset 110 via I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disk controller to HDD 154, to ODD 156, and to disk emulator 160. Disk interface 152 may include an integrated drive electronics (IDE) interface, an advanced technology attachment (ATA) such as a parallel ATA (PATA) interface or a serial ATA (SATA) interface, a SCSI interface, a USB interface, a proprietary interface, or a combination thereof. Disk emulator 160 permits a solid-state drive (SSD) 164 to be connected to information handling system 100 via an external interface 162. An example of external interface 162 includes a USB interface, an IEEE 1394 (Firewire) interface, a proprietary interface, or a combination thereof. Alternatively, SSD 164 can be disposed within information handling system 100.

I/O interface 170 includes a peripheral interface 172 that connects I/O interface 170 to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a NIC, a sound/video processing card, another add-on resource, or a combination thereof. Add-on resource 174 can be on a main circuit board, a separate circuit board or an add-in card disposed within information handling system 100, a device that is external to the information handling system, or a combination thereof.

Network interface device 180 represents a network communication device disposed within information handling system 100, on a main circuit board of the information handling system, integrated onto another element such as chipset 110, in another suitable location, or a combination thereof. Network interface device 180 includes a network channel 182 that provides an interface to devices that are external to information handling system 100. In a particular embodiment, network channel 182 is of a different type than peripheral channel 172 and network interface 180 translates information from a format suitable to the peripheral channel to a format suitable to external devices. In a particular embodiment, network interface device 180 includes a NIC or host bus adapter (HBA), and an example of network channel 182 includes an InfiniBand channel, a fiber channel, a gigabit Ethernet channel, a proprietary channel architecture, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from the processor 102, which provides various management functions for information handling system 100. In an embodiment, BMC 190 grants access to an external device. The BMC 190 may communicate with the external device using a network interface 198.

In an embodiment, the BMC 190 implements an integrated remote access controller (iDRAC) that operates to monitor and maintain system firmware, such as code stored in BIOS/EFI module 142, option ROMs for graphics interface 130, disk controller 150, add-on resource 174, network interface 180, or other elements of information handling system 100, as needed or desired. In particular, BMC 190 includes the network interface 198 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

Mode controller 195 includes thermal management hardware circuitry that is configured to implement thermal and power management in the information handling system. In various embodiments, the thermal and power management may implement customizing of parameters of a thermal policy in the information handling system. The parameters may include performance level, acoustic sound level, skin temperature, cooling fans speed, and the like. The thermal policy may include a configuration of the information handling system that generates a particular setting of the parameters. In these embodiments, the particular setting of the thermal policy can limit an end-user's option of modifying the parameters. Accordingly, the mode controller 195 can provide an additional level of modification to satisfy an end-user's expectation for thermal and power management.

Figure 2:
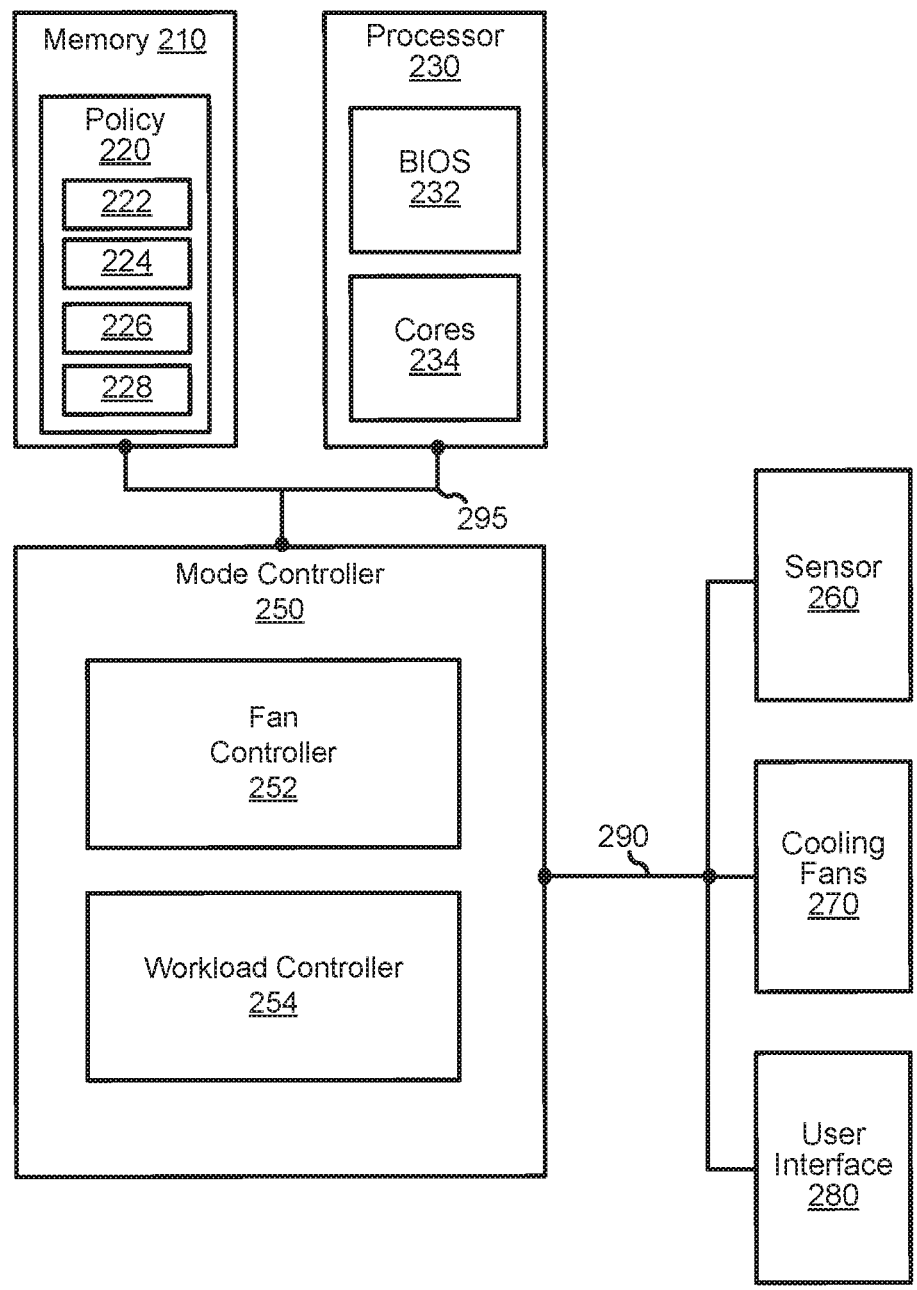
FIG. 2 is a block diagram illustrating a portion of the information handling system according to an embodiment of the present disclosure.

FIG. 2 shows an information handling system 200 that includes a memory 210, a policy 220, processor 230 that includes a BIOS 232 and processor cores 234, and a mode controller 250. The policy 220 includes an optimized policy 222, a cool policy 224, a quiet policy 226, and a performance policy 228. The mode controller 250 includes a fan controller 252 and a workload controller 254. The information handling system 200 further includes a sensor 260, cooling fans 270, and a user interface 280. A first interface 290 connects the mode controller 250 to the sensor 260, cooling fans 270, and the user interface 280. A second interface 295 connects the memory 210 and the processor 220 to the mode controller 240. The elements and components of the information handling system 200 are similar to the elements and components of the information handling system 100.

As an operation overview of the information handling system 200, the BIOS 232 may select from the memory 210 a policy 220 that facilitates a default configuration of the fan controller 252 and/or the workload controller 254 for the system thermal and power management. The default configuration may be selected at the system startup to obtain a quiet operation, a higher performance level, a cooler housing temperature, or a system optimization that includes balanced acoustic sound level, performance level, and housing temperature. To enhance end-user's expectations, the mode controller 250 dynamically adjusts the fan controller 252 and/or the workload controller 254 to customize the parameters of the selected policy 220. The customization may be based upon end-user preferences. In various embodiments, the customization utilizes a manual mode that is based upon an end-user entered input value; an intelligent mode that is based upon detected platform events; or a historical data mode that utilizes previously recorded configurations. The detected platform events include workload changes, acoustic sound level of speaker or headsets, present date and time, and the like. In these embodiments, the manual mode, intelligent mode, historical data mode, or a combination thereof, includes interactive user selectable thermal tables to provide widened modification options for the end-user.

The policy 220 may include a thermal management table reference that can be used by the BIOS 232 to obtain default setting for the fan controller 252 and/or the workload controller 254. The default setting may generate quiet operation upon selection of the quiet policy, higher performance upon selection of the performance policy, and so on. The selection can be made during the system startup or during regular operation of the information handling system. For example and during the regular operation of the information handling system, the end-user can select the cool policy 224 to respond to detected platform problems such as critical temperature conditions. In another example, the end-user can select the performance policy 228 in case of high workload, and so on. An example of the policy 220 may include an Intel Dynamic Power and Thermal Framework (DPTF), an ARM Intelligent Power Allocation framework, or the like.

Optimized policy 222 includes a preconfigured value of indexes that provide balance in performance level, housing temperature, acoustic sound level, and the like. In this case, the optimized policy 222 includes a setting of the fan controller 252 and the workload controller 254 that produces average results with regard to amount of thermal impact, performance level, and acoustic impact. For example, the fan controller 252 may set the cooling fans 270 to have a speed index of 2900 revolution per minute (rpm) while the workload controller 254 can configure the cores 234 to generate 80% performance level index. In this example, the optimized policy 222 provides balance in the noise, thermal impact, and acceptable level of performance. Cool policy 224 includes a preconfigured value of indexes that provide a cooler system surface temperature. The end-user preference when using the cool policy 224 includes lesser amount of heat in the system housing. For example, the cooling fans 270 may be configured to have a speed index of 4500 rpm to maintain a temperature range index of 40° C. to 45° C. In this example, the cool policy 224 provides a cooler skin temperature although the acoustic impact may increase.

Quiet policy 226 includes a preconfigured value of indexes that provide a reduced amount of acoustic sound level in the information handling system. The reduced acoustic sound level can be provided by a decreased cooling fan speed and/or performance level. For example, the fan controller 252 may set the cooling fans 270 to have a speed index of 1000 rpm to maintain an acoustic sound level index of 0.2 S. In this example, the lower acoustic impact may require the workload controller 254 to reduce the workload as well. Performance policy 228 includes a preconfigured value of indexes to provide higher performance level in the information handling system. For example, the workload controller 254 can be set to increase workload in the cores 234. In this example, higher performance level can be obtained although higher acoustic impact may be produced as well.

Mode controller 250 represents an element of information handling system 200 that operates to control the workload in the information handling system and the cooling fans 270. As such, mode controller 250 represents a hardware component of information handling system 200 that operates to provide signals to the processor 230 and the cooling fans 270. The control of processor performance levels and fan speed levels are known in the art, and the details of processor performance level and fan speed management will not be further disclosed herein except as needed to describe the present embodiments.

In a particular embodiment, mode controller 250 operates in-band with the processor 230. That is, the operation of mode controller 250 is provided based upon the execution by processor 230 of code that implements the functions and feature of the mode controller. Here, mode controller 250 may also represent firmware or software instantiated on information handling system 200, such as a system BIOS or UEFI, device firmware, OS functionality, an application, or the like, that is configured to provide the functions and features of the mode controller. In another embodiment, mode controller 250 is configured like the BMC and operates out-of-band with processor 230. That is, the operation of mode controller 250 is provided based upon a hardware circuit that is independent of processor 230, or based upon the execution by a separate processor or controller of code that operates independently of the processor. In yet another embodiment, the functions and features of mode controller 250 may be provided by a combination of in-band and out-of-band elements, as needed or desired.

In various embodiments, the mode controller 250 may implement different modes in customizing the selected policy 220. The different modes may include the manual mode, intelligent mode, or the historical data mode. In these embodiments, the end-user can toggle between the modes to use in the customization of the selected policy. For example, the end-user initially utilizes the manual mode during a first hour, activates the intelligent mode during a second hour, and uses the historical data mode at a third hour. In an embodiment, the manual mode is based from a preconfigured thermal table that includes indexes for synchronized adjustments of the performance level, surface temperature, cooling fans speed, acoustic sound level, and other parameters. In this embodiment, the preconfigured thermal table includes a spectrum of preconfigured index values for different parameters of the selected policy 220. For example, the spectrum of preconfigured index values for the parameter—acoustic sound level may be spread between 0-3.6 S with an increment of 0.2 S for each acoustic sound level index. In this example, each increment of the acoustic sound level index may include corresponding preconfigured values for the performance level and the cooling fan speed indexes. In this case and when the end-user enters a particular input value of desired acoustic sound level, the mode controller 250 may use the input value to adjust the workload and/or the cooling fan speed. Thus, the manual mode may implement interactive user selectable thermal table to widen end-user options of customizing the selected policy 220.

In an embodiment, the intelligent mode is based from preconfigured thermal table that includes indexes for synchronized adjustments of the performance level, surface temperature, cooling fans speed, acoustic sound level, and other parameters. In this embodiment, the selection of indexes for the intelligent mode is based upon the detected platform event and a setting that is associated with the detected platform event. The detected platform event includes additional parameters such as detected workload changes, present date and time, speaker or head set sounds, detected acoustic sound level of ambient environment, and the like. The associated setting includes the corresponding configuration of the fan controller 252 and the workload controller 254. For example, the information handling system is presently running at a performance level of 96% and at an acoustic sound level of 3 S. With the intelligent mode, the detection of the platform event may trigger changes in the performance level and the acoustic sound level. For example, the detected platform event includes present time of 1 AM where the associated setting includes decreasing of the performance level. In this case, the workload controller 254 can use the setting associated with the detected present time of 1 AM to reduce the performance level.

In an embodiment, the historical data mode is based from preconfigured thermal table that includes indexes of previously recorded configurations of the mode controller 250 based from the detected platform event. The historical data mode similarly facilitates synchronized adjustments of the performance level, surface temperature, cooling fans speed, and the acoustic sound level. For example, the detected platform event includes detected changes in workload. In this example, the mode controller 250 may search for stored configurations of the workload controller 254 that were used upon detection of similar workload changes. In this case, the workload controller 254 utilizes the historical data to customize the selected policy.

Sensor 265 may include hardware circuitry that is configured to measure signals that can be used by the mode controller 250 to modify the selected policy 220. In various embodiments, the sensor 260 may include a thermostat, one or more microphones to measure acoustic sound levels, a processor speed detector, power measurements, and the like. For example, the sensor 260 may measure system temperature, acoustic sound level, change in workload, a time of day, skin temperature, ambient temperature, ambient sound level, etc. In this example, the mode controller 250 may utilize the measured information to set the cooling fans 270 and/or the workload in the cores 234. Cooling fans 270 may include hardware circuitry configured to circulate air within the information handling system. In various embodiments, each component such as the processor 102 may utilize one or more fans to maintain temperature. User interface 280 may include an input box for the end-user to enter a particular index value, or the user interface may include a slider scale that displays increments of index values for the synchronous adjustments of the performance level, surface temperature, and/or the acoustic sound level. The user interface 280 may further display the different customization modes as interactive user selectable thermal tables.

FIG. 3 shows a thermal table reference 300 that can be used by the mode controller 250 to modify the selected policy 220. The thermal table reference 300 includes different parameters such as cooling fans sound levels 310, cooling fans speed 320, performance level 330, and skin temperature 340. The thermal table reference 300 further shows example preconfigured settings for the optimized policy 222, cool policy 224, quiet policy 226, and the performance policy 228. The example settings for the optimized policy 222, cool policy 224, quiet policy 226, and the performance policy 228 provide limited thermal options to the end-user and in this regard, the thermal table reference 300 may include tens or hundreds of increments to enhance end-user's thermal expectations. In various embodiments, the preconfigured values of parameter indexes can be derived during initial calibration of the mode controller 195, or may be received from external sources. Each preconfigured value of the parameter index may include corresponding preconfigured values for the other indexes. For example, a portion 350 shows a parameter index of 2.5 S for the cooling fan sound level 310. In this example, the 2.5 S parameter index corresponds to preconfigured values of 3600 rpm, 88% performance level, and 76° C. skin temperature of the other parameter indexes. In an embodiment, the end-user may enter a desired input value of the cooling fans sound level 310 using the scaled slide in the user interface 280, or the end-user may manually enter the preconfigured value in an entry box. In this embodiment, the mode controller 250 may use the end-user entered input value to adjust the fan speed and/or the workload to obtain the corresponding preconfigured indexes in the thermal table reference 300.

Figure 4:
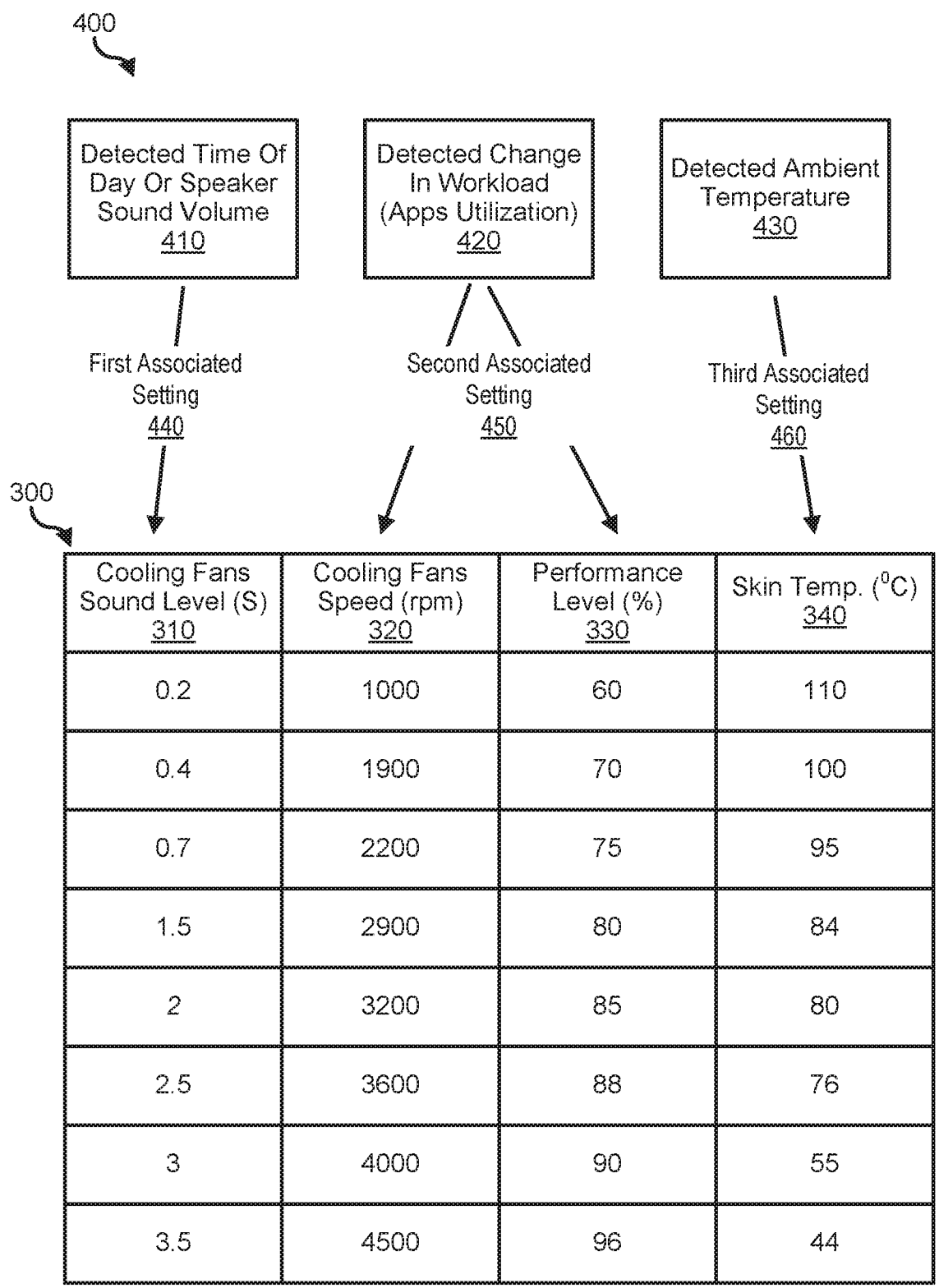
FIG. 4 is a reference data table of an intelligent mode that can be used by the mode controller to customize the policy according to an embodiment of the present disclosure.

FIG. 4 shows an intelligent mode thermal table 400 that can be used by the mode controller 250 to modify the selected policy 220. The intelligent mode thermal table 400 includes detected platform events such as a detected time of day or speaker sound volume 410, detected change in workload 420, and a detected ambient temperature 430. The intelligent mode thermal table 400 further includes a first associated setting 440, a second associated setting 450, and a third associated setting 460, for the detected time of day or speaker sound volume 410, detected change in workload 420, and the detected ambient temperature 430, respectively. In various embodiments and with the intelligent mode, the mode controller 250 determines first the detected platform event. Afterward, the mode controller 250 determines and applies the setting that is associated with the detected platform event. For example, the mode controller 250 detects a particular time of 2 AM as the present time of day 410. Assuming that the detected particular time of 2 AM includes the first associated setting 440 of 0.7 S acoustic sound level, then the mode controller 250 may use the 0.7 S acoustic sound level index as a reference to customize the selected policy 220. That is, the fan controller 252 and the workload controller 254 can adjust the fan speed and workload to 2200 rpm and 75% performance level, respectively. In another example, the mode controller 250 detects a high workload increase. Assuming that the second associated setting 450 for the detected increase in high workload includes a change in the particular value of the cooling fans speed 320, then the fan controller 252 may use the change to adjust the setting of the cooling fans, and so on.

Figure 5:
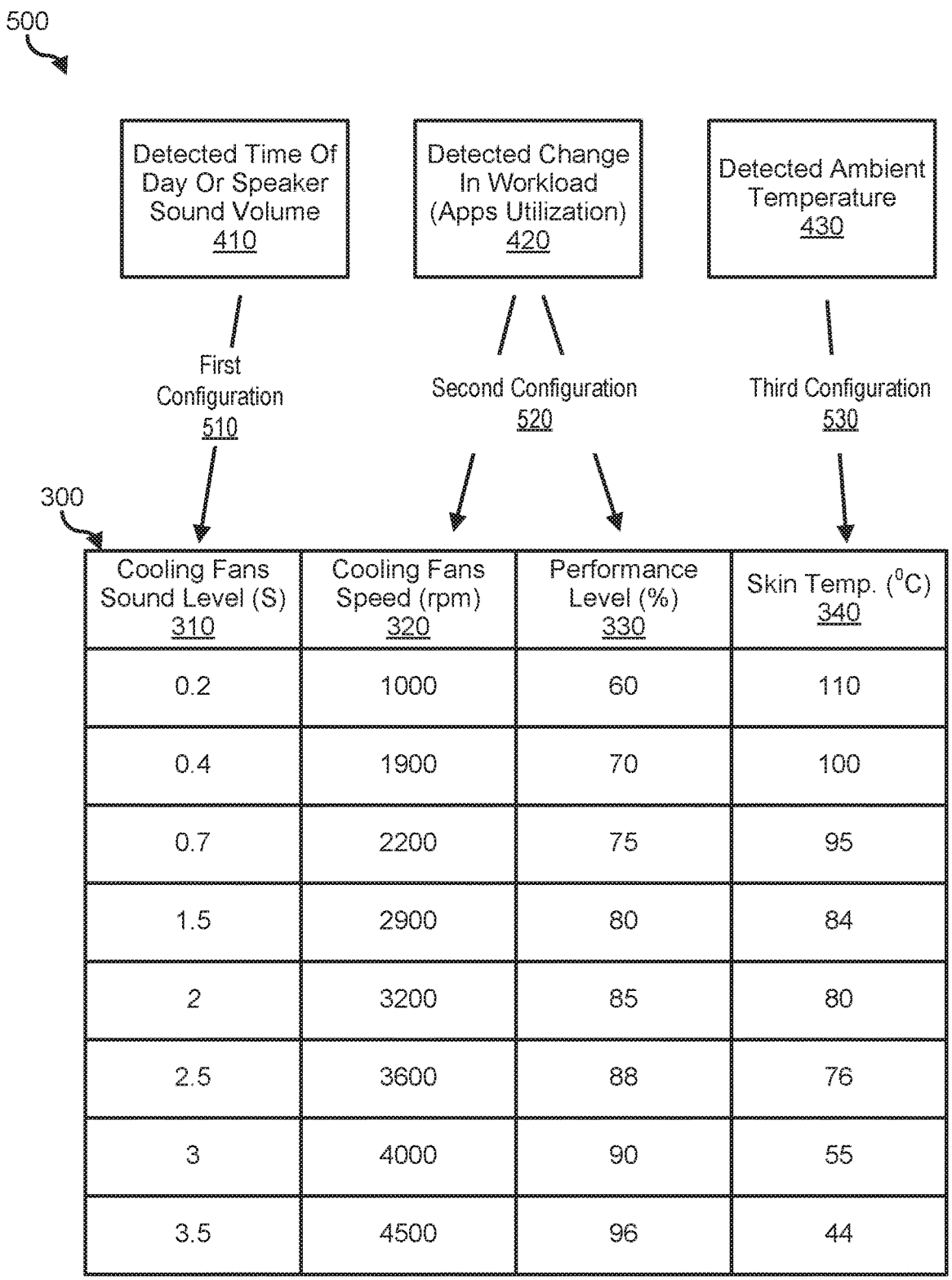
FIG. 5 is a reference data table of a historical data mode that can be used by the mode controller to customize the policy according to an embodiment of the present disclosure.

FIG. 5 shows a historical data mode thermal table 500 that can be used by the mode controller 250 to modify the selected policy 220. In various embodiments, the historical data mode thermal table 500 is similar to the intelligent mode thermal table 400 except that the mode controller 250 may utilize previously recorded configurations that are associated with the detected platform event. The previously recorded configurations may include a first configuration 510, a second configuration 520, and a third configuration 530 that are associated with the detected time of day or speaker sound volume 410, detected change in workload 420, and the detected ambient temperature 430, respectively. For example, the mode controller 250 detects a particular time of 2 AM as the present time of day 410. Assuming that the first configuration 510 that is associated with the particular time of 2 AM includes a particular setting of the fan controller 252, then the fan controller 252 may use the particular setting to customize the selected policy 220. In another example, the mode controller 250 detects a high workload increase. Assuming that the second configuration 520 that is associated with the detected increase in high workload includes a particular setting of the cooling fans speed 320, then the fan controller 252 may use the particular setting from the previous events to customize the selected policy 220, and so on.

Figure 6:
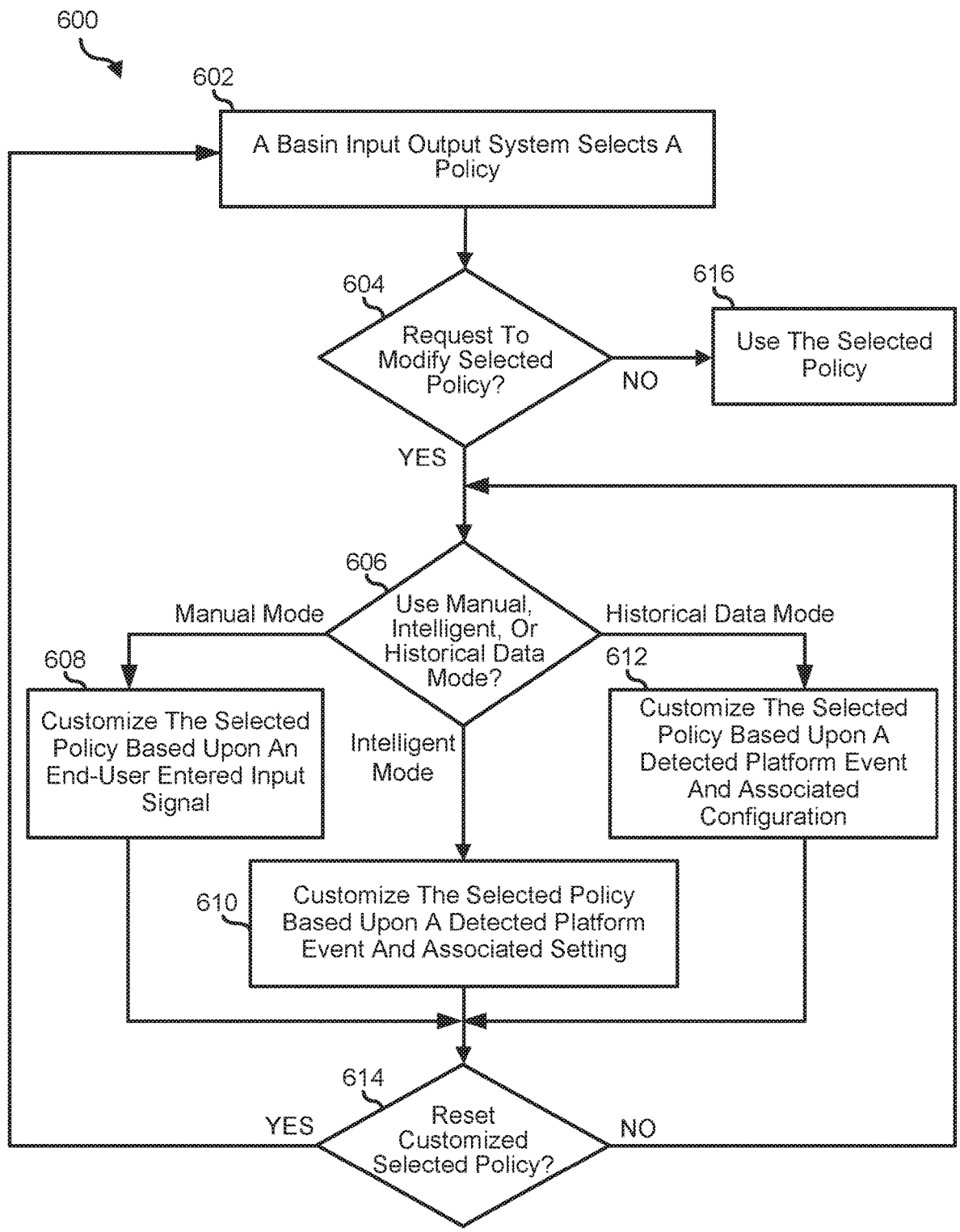
FIG. 6 is a flow chart showing a method of thermal management according to an embodiment of the present disclosure.

FIG. 6 shows a method 600 for managing thermal management in the information handling system. At block 602, the BIOS 232 selects the policy 220. For example, the BIOS 232 selects the optimized policy 222, cool policy 224, quiet policy 226, or the performance policy 228 during the system startup. In this example, the optimized policy 222 can be the default setting during the system startup if no selection is made by the BIOS 232. At block 604, the mode controller 250 determines whether a request is made to modify the selected policy 220. For example, the request may be entered by the end-user. In response to receiving of the request to modify the selected policy 220, and at block 606, the mode controller 250 determines the customization mode to be utilized. For example, the customization can include the manual mode, intelligent mode, or the historical data mode.

For the selected manual mode, and at block 608, the mode controller 250 utilizes the manual mode for the synchronized adjustments of the performance level, surface temperature, cooling fans speed, and the acoustic sound level. For the selected intelligent mode, and at block 610, the mode controller 250 utilizes the intelligent mode for the synchronized adjustments of the performance level, surface temperature, cooling fans speed, and the acoustic sound level, based upon the detected platform event and the setting that is associated with the detected platform event. For the selected historical data mode, and at block 612, the mode controller 250 utilizes the historical data mode for the synchronized adjustments of the performance level, surface temperature, cooling fans speed, and the acoustic sound level, based upon the detected platform event and the previous event configuration that is associated with the detected platform event.

After the modification of the selected policy, and at block 614, the mode controller 250 determines whether a reset is requested. In response to resetting of the customized policy, the customized selected policy is reconfigured to its original state and the process goes back to block 602. In response to non-resetting of the customized USTT mode, the process goes back to block 606. Returning to block 604, and in response to absence of end-user entered request to modify the selected policy, the mode controller 250, at block 616, utilizes the selected policy.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

For purposes of this disclosure, the information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, the information handling system can be a personal computer, a laptop computer, a smart phone, a tablet device or other consumer electronic device, a network server, a network storage device, a switch router or other network communication device, or any other suitable device and may vary in size, shape, performance, functionality, and price. Furthermore, the information handling system can include processing resources for executing machine-executable code, such as a central processing unit (CPU), a programmable logic array (PLA), an embedded device such as a System-on-a-Chip (SoC), or other control logic hardware. Information handling system can also include one or more computer-readable medium for storing machine-executable code, such as software or data. Additional components of information handling system can include one or more storage devices that can store machine-executable code, one or more communications ports for communicating with external devices, and various I/O devices, such as a keyboard, a mouse, and a video display. Information handling system can also include one or more buses operable to transmit information between the various hardware components.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system having improved thermal management, comprising:
a basic input output system configured to select a policy; and
a mode controller configured to control a fan speed and a workload to customize the selected policy, wherein the customization utilizes a manual mode, an intelligent mode, or a historical data mode, wherein the intelligent mode facilitates synchronized adjustments of the fan speed and the workload of the selected policy based upon a detected platform event and a setting that is associated with the detected platform event.

2. The information handling system of claim 1, wherein the selected policy includes a default configuration of the fan speed and the workload.

3. The information handling system of claim 1, wherein the detected platform event includes a detected change in workload or a time of day.

4. The information handling system of claim 1, wherein the setting includes a preconfigured index value that is used by the mode controller as a reference to customize the selected policy.

5. The information handling system of claim 1, wherein the mode controller utilizes preconfigured values of indexes in the manual mode to customize the selected policy.

6. The information handling system of claim 1, wherein the manual mode facilitates synchronized adjustments of the fan speed and the workload of the selected policy based upon an end-user entered information.

7. The information handling system of claim 1, wherein the mode controller utilizes the historical data mode to synchronize adjustments in the fan speed and the workload of the selected policy based upon a detected platform event and a configuration that is associated with the detected platform.

8. The information handling system of claim 7, wherein the configuration includes recorded data from previous events.

9. The information handling system of claim 1 further comprising a sensor configured to detect thermal management parameters that include a system temperature, acoustic sound level, change in workload, a time of day, and skin temperature.

10. An information handling system, comprising:
a basic input output system configured to select a default configuration of a fan speed and a workload; and
a mode controller configured to synchronously customize the selected configuration of the fan speed and the workload, wherein the synchronous customization utilizes a manual mode, an intelligent mode, or a historical data mode, wherein preconfigured values of indexes of the manual mode are derived from an initial calibration of the mode controller.

11. The information handling system of claim 10, wherein the basic input output system performs the selection during a system startup.

12. The information handling system of claim 10, wherein the intelligent mode facilitates synchronized adjustments of the fan speed and the workload based upon a detected platform event and a setting that is associated with the detected platform event.

13. The information handling system of claim 12, wherein the detected platform event includes a detected change in workload or a time of day.

14. The information handling system of claim 12, wherein the setting includes a preconfigured index value that is used by the mode controller to adjust the selected configuration of the fan speed and the workload.

15. The information handling system of claim 10, wherein the mode controller includes a fan controller and a workload controller.

16. A method, comprising:
selecting, by a basic input output system, a default thermal configuration of a fan speed and a workload; and
customizing, by a mode controller, the selected default thermal configuration by controlling the fan speed and the workload, wherein the customization utilizes a manual mode, an intelligent mode, or a historical data mode, wherein preconfigured values of indexes in the manual mode are utilized to customize the selected policy.

17. The method of claim 16, wherein the intelligent mode is based upon a detected platform event and a setting that is associated with the detected platform event.

18. The information handling system of claim 17, wherein the detected platform event includes a detected change in workload or a time of day.

* * * * *